(No Model.)

J. M. HOLLER.
RUNNING GEAR FOR VEHICLES.

No. 501,072. Patented July 11, 1893.

WITNESSES
F. L. Ourand
Jos. Gregory

INVENTOR
John M. Holler,
per W. H. Singleton,
Attorney

UNITED STATES PATENT OFFICE.

JOHN M. HOLLER, OF ALBANY, NEW YORK.

RUNNING-GEAR FOR VEHICLES.

SPECIFICATION forming part of Letters Patent No. 501,072, dated July 11, 1893.

Application filed January 11, 1893. Serial No. 458,039. (No model.)

*To all whom it may concern:*

Be it known that I, JOHN M. HOLLER, a citizen of the United States, residing at Albany, in the county of Albany, in the State of New York, have invented a new and useful Improvement in Running-Gear, of which the following is a specification.

This invention relates to an improvement in running gear, more particularly to that shown in my United States Patent No. 472,295. In the present invention the upper fifth wheel plate is brought down and secured to the reach and they are braced as will be explained.

The invention consists in a fifth wheel, in which the pivot is back of the front axle, combined with a reach, the upper fifth wheel plate being secured to the reach as will be explained.

Figure 1:
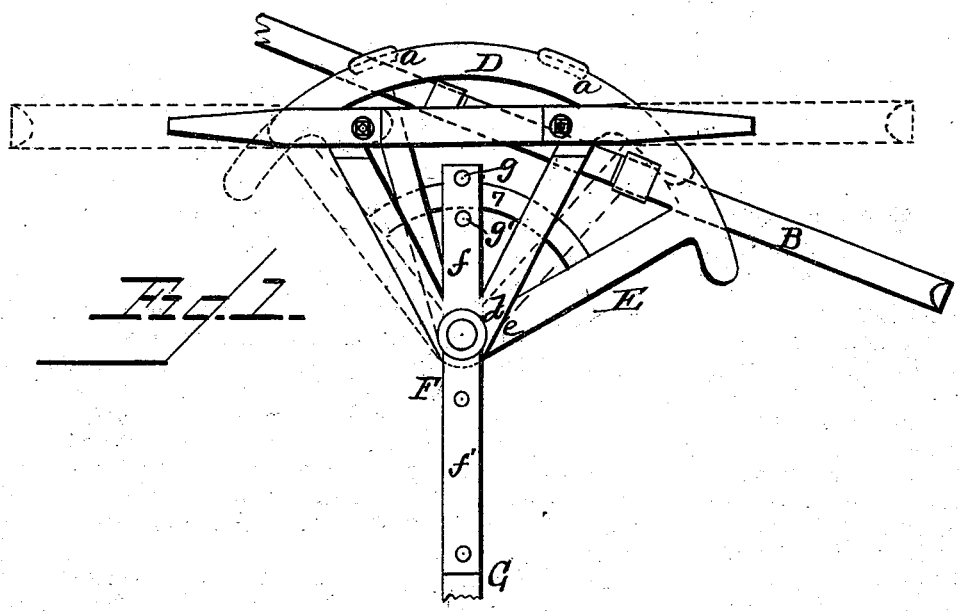
Figure 2:
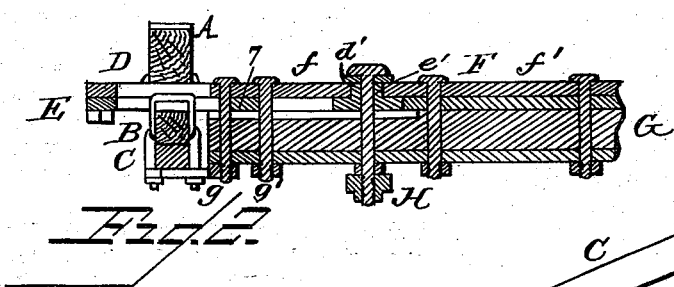
Figure 3:
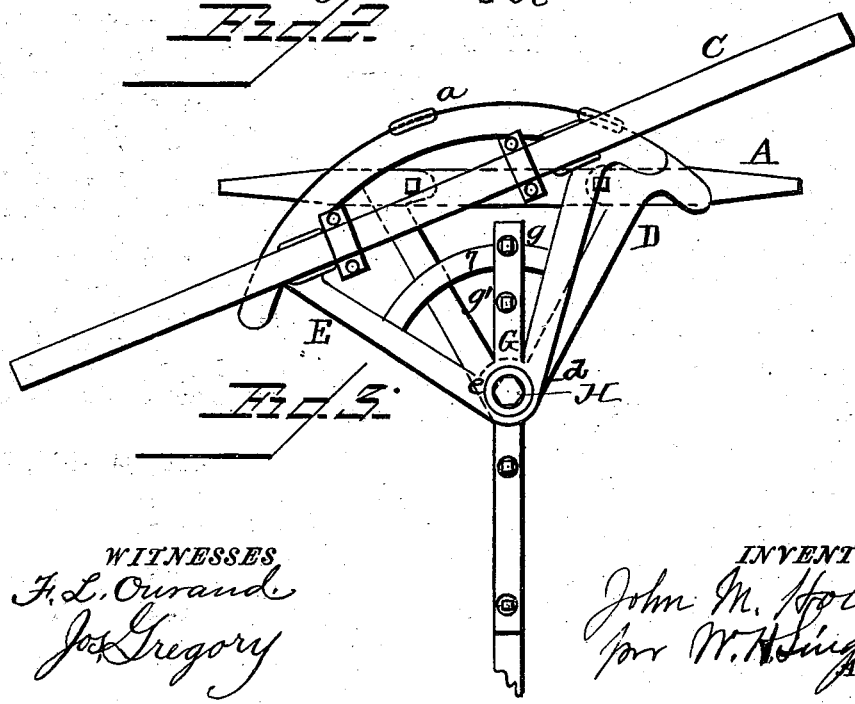

In the drawings: Figure 1 represents a top view. Fig. 2 represents a median longitudinal view. Fig. 3 represents a bottom view.

In the annexed drawings, the letter A indicates the ordinary head block; B the bed piece and C the forward axle. Secured to the head block A and the bed piece B by clips, are the top and bottom plates D and E of the fifth wheel, the same being substantially sector shaped. These plates are held together in front by the lugs $a$—$a$ and engage each other at their angles $d$ and $e$ where a boss $e'$ of one extends into a hole $d'$ of the other. Integral with the upper fifth wheel plate is the strap F which extends forwardly and backwardly at $f$—$f'$. The reach G is held to the fifth wheel by the king bolt H which passes down through the boss $e'$. The reach also extends forward of the king bolt. At the rear of the king bolt the reach G is bolted to the extension $f'$ of the strap F. In front of the king bolt, the reach G, is secured to the front extension $f$ of the strap F by the bolts $g$—$g'$, one of which $g$ is in front of and the other $g'$ at the rear of the arc 7 upon the lower plate, the arc being constructed as shown in the patent referred to. This extension of the reach in front of the king bolt forms a brace both forward and backward, the forward end of the reach being clipped or secured to one of the fifth wheel plates in such a manner as to admit of lateral movement of the same and yet to take all longitudinal strain in the reach from off of the king bolt.

In the construction described, I do away with the fifth wheel above the spring, shown in my patent, and bring it down to the reach, being a better and neater arrangement for pleasure vehicles. I also get a double brace both forward and backward by bolting the reach on both sides of the arc 7. In such construction the brace is secured in both directions forward and backward so that it will resist shock in both directions.

Having described my invention, what I claim is—

1. In a running gear in which the pivot of the fifth wheel is back of the front axle; the combination of the upper fifth wheel plate and the reach with the king-bolt and the lower fifth wheel plate, the said reach being pivoted upon the king-bolt and at its forward end clipped to one of the fifth wheel plates, whereby all longitudinal strain in the reach is taken from off of the king-bolt.

2. In a running gear in which the pivot of the fifth wheel is back of the front axle; the combination of the lower fifth wheel plate having the arc 7; and the king bolt with the reach and the brace extending from the king bolt and held upon both sides of the arc as set forth.

JOHN M. HOLLER.

Witnesses:
HENRIETTA HOYLAND,
FRANCIS STRYKER.